United States Patent [19]

Culverhouse

[11] Patent Number: 5,122,979
[45] Date of Patent: Jun. 16, 1992

[54] METHOD AND A DIGITAL ELECTRONIC DEVICE FOR THE EVALUATION OF AN EXTREMUM OF A SET OF BINARY ENCODED DATA WORDS

[75] Inventor: Philip F. Culverhouse, Devon, England

[73] Assignee: Plessey Semiconductors Limited, Ilford, England

[21] Appl. No.: 528,973

[22] Filed: May 29, 1990

[30] Foreign Application Priority Data

May 31, 1989 [GB] United Kingdom ............. 8912484

[51] Int. Cl.5 ............... G06F 7/02; G06F 7/24
[52] U.S. Cl. .................. 364/715.06; 340/146.2
[58] Field of Search ............ 364/715.06; 340/146.2

[56] References Cited

U.S. PATENT DOCUMENTS

| | | | |
|---|---|---|---|
| 4,446,452 | 5/1984 | Munter | 364/715.06 |
| 4,918,636 | 4/1990 | Iwata et al. | 364/715.06 |
| 4,998,219 | 3/1991 | Frauenglass | 364/715.06 |

OTHER PUBLICATIONS

Yuen, "A Bit-Serial Device for Maximization and Sorting" *Proceedings of the IEEE*, vol. 68, No. 2, Feb. 1980, pp. 296-297.

*Primary Examiner*—David H. Malzahn
*Attorney, Agent, or Firm*—Fleit, Jacobson, Cohn, Price, Holman & Stern

[57] ABSTRACT

A method and a device (FIG. 2) in which the maximum or the minimum or both of a data set are evaluated by tag propagation through a series of iterations. The number of iterations required is equal to the word size, i.e. the number of bits per word. Iterations may be performed serially using a series of logic stages, as shown, or they may be performed cyclically using a single stage of logic circuitry. For the evaluation of the maximum, a tag is propagated for each word for which a tag has already been propagated from the previous iteration and either the word bit for that iteration is of logic value 1 or if not 1 the word bit for each and every word for that iteration is 0. A tag is propagated throughout all iterations only for the maximum and this tag is then used to select the corresponding data word that is the maximum. The same may be performed for the inverse of each word bit to evaluate the minimum. In this case a tag is propagated for each word for which a tag has been propagated from the previous iteration and either the word bit represented is 0 or if not 0 when the word bits for that iteration are all 1.

Implementations are disclosed for both ordinary logic Active HIGH, and for inverted logic, Active LOW.

The electronic devices may be combined in parallel and in series to allow evaluation of larger word sets.

6 Claims, 9 Drawing Sheets

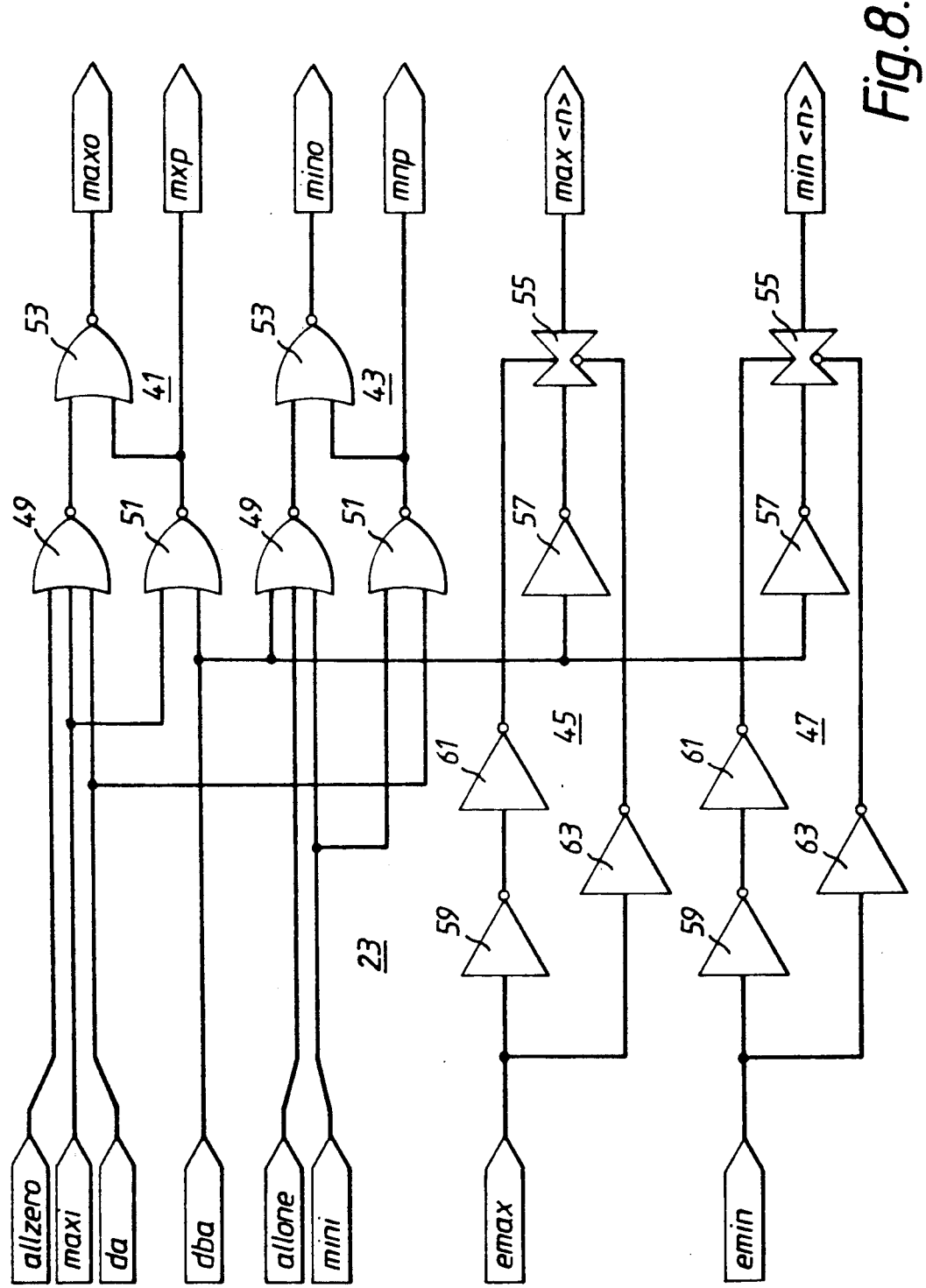

METHOD AND A DIGITAL ELECTRONIC DEVICE FOR THE EVALUATION OF AN EXTREMUM OF A SET OF BINARY ENCODED DATA WORDS

The present invention concerns improvements in or relating to methods and digital electronic devices for the evaluation of extrema i.e. maximum or minimum or both, of a set of binary encoded data words. Such device have application for example as noise filters in video signal processors and the like.

Hitherto it has been customary practice to evaluate the maximum or the minimum or both extrema of a data set using a sorting algorithm in which the word members of the data set are progressively ranked in order of magnitude. After ranking has been performed the maximum or the minimum members of the data set may be selected according to the appropriate position of members at the top and bottom of the ordered data set. Employing prior art tehniques this ranking process may be completed in $Mlog_e M$ sorting steps, where M is the number of words constituting the data set.

The present invention provides both a method and a device that implements an alternative iterative algorithm, and in particular an algorithm for which the number of iterations required is dependent not upon the number M of words constituting the set of data, but upon the number N of bits per word. In most common practice therefore, the number of iterations necessary for the evaluation of the extremum or extrema, will be smaller using this alternative algorithm. This advantage significant particularly in the case of real time signal processing.

In this invention the maximum or minimum or both extrema of a data set are elucidated by tag propagation. This is, contrary to prior art where data is propagated through iterations of the algorithm, a tag is maintained for each data word of the set and this tag may be altered during evaluation of the algorithm. After final iteration of the algorithm the data words of the set that still have their tags set ·TRUE· are deemed to be the maximum or minimum of the data set.

In accordance with a first aspect of this invention there is provided a method for the evaluation of an extremum of a set of binary encoded data words, each of which data words has a common number N of word bits, namely a most significant word bit and N−1 word bits of lower significance, each of which word bits has a respective one of two logic values, either a first logic value or a second logic value, which method comprises the following steps:

representing each word bit by at least one test bit;

starting with a set of the test bits that is representative of all the most significant word bits, performing a series of N successive iterations, each respectively upon a successive set of the test bits, each successive set of the test bits representing respectively word bits that are all of the same consecutive significance thereby to propagate a tag signal which throughout the series of N successive iterations is set as ·TRUE· and which after a final iteration is indicative of the extremum; and using the tag signal so propagated to select the extremum; wherein in the first of the series of N successive iterations, a respective tag signal for each data word is initiated, which respective tag signal is set ·TRUE· provided that either the most significant bit of its data word is of the first logic value or the most significant bit of each and every data word is of the second logic value, else the respective tag signal is ·FALSE·; and in each successive iteration thereafter, and only for each select data word for which a respective tag signal is propagated as set ·TRUE· in the immediately preceding iteration, the respective tag signal is propagated as set ·TRUE· if either the respective bit of its select data word is of the first logic value or the respective bit of each and every select data word is of the second logic value, else the respective tag signal is reset as ·FALSE·.

In the method aforesaid, the maximum may be determined, in which case the first and second logic values have the values 1 and 0 respectively. Alternatively the minimum may be evaluated and the first and second logic values accorded the values 0 and 1 respectively.

The method aforesaid may be performed by carrying out the iterations in a cyclic manner, storing the results of each successive iteration and recycling stored tags and stored test bits through a single stage logic device. For fastest processing however, it is advantageous to perform the method aforesaid in a serial manner using a multistage device in which test bits representing word bits of the same consecutive significance are directed to consecutive stages and tag signals passed from stage to stage during performance of the iterations.

In accordance with another aspect of the present invention there is provided a digital electronic device for performing the method defined above, which device comprises:

source means to provide a multiplicity of test bits, at least one of two representative test bits for each word bit of each data word; a plurality N of logic stages, namely a most significant bit logic stage and a plurality N−1 of lower significance bit logic stages including a least significant bit logic stage, each to perform an iteration, each logic stage having at least one of two bit inputs for each word, all of which are connected to the source means to receive collectively a set of the test bits, which set for each respective logic stage is representative of word bits of the same respective significance, each logic stage also having a plurality of tag signal outputs, one for each data word, and each lower significance bit logic stage also having a plurality of tag signal inputs, one for each data word, each one connected to a respective one of the plurality of tag signal outputs of the logic stage immediately preceding; and data word selection means, having a plurality of tag signal inputs, one for each data word, each one connected to a respective one of the plurality of tag signal outputs of the least significant bit logic stage, to select an extremum data word indicated by a tag signal propagated as set ·TRUE·; wherein the most significant bit logic stage includes a first logic circuit connected between the bit inputs and the tag signal output thereof to initiate a tag signal for each word, which first logic circuit functions to provide a respective tag signal set as ·TRUE· for each data word having a most significant bit of the first logic value, or every respective tag signal set as ·TRUE· if every most significant bit is of the second logic value, else respective tag signals are ·FALSE·; and each lower significance bit logic stage includes a second logic circuit connected between the bit inputs, tag signal input and tag signal outputs, which second logic circuit functions to provide for each select data word corresponding to a tag signal set as ·TRUE· at the tag signal output of the logic stage immediately preceding, a respective tag signal set as ·TRUE· if either the respective word bit is of the first logic value, or every respective word bit of the select data words is of the second logic value, else respective tag signal rest as ·FALSE·.

In the digital electronic device aforesaid data may be provided form a primary source. In this case each test bit that is representative of a word bit may be provided as the word bit itself. Alternatively a primary data source may be used in conjunction with inverters and each test bit provided as the inverse of each word bit represented. In preference to the foregoing the test bits may be provided using a secondary data source for example a bank of flip flop registers or the like in which word bits may be stored and released as test bits having either the same logic value or the inverse logic value of the word bits represented.

It is both convenient and possible to combine devices in parallel to enable evaluation of both the maximum and the minimum of a set of data. In this context it is observed that the maximum of an inverted set of data words is the inverse of the minimum of that set. It is convenient thus to employ identical circuits for the evaluation of maximum and minimum. In implementations where the maximum is evaluated using test bits that are of the same value as the word bits represented, the minimum may be evaluated by applying instead test bits that are inverted with respect to the word bits represented. In other implementations where two complementary test bits are used to represent each word bit, and a circuit used for evaluation of the maximum, this same circuit or a duplicate may be used for evaluation of the minimum by simple reversal of connections to the test bit outputs of the source means.

These and other features of the invention are enumerated in the claims that follow hereinafter.

In the drawings accompanying this specification:

FIG. 8 is a circuit diagram showing the detailed sub-circuit form of the cell shown in preceding FIG. 7;

Figure 1:
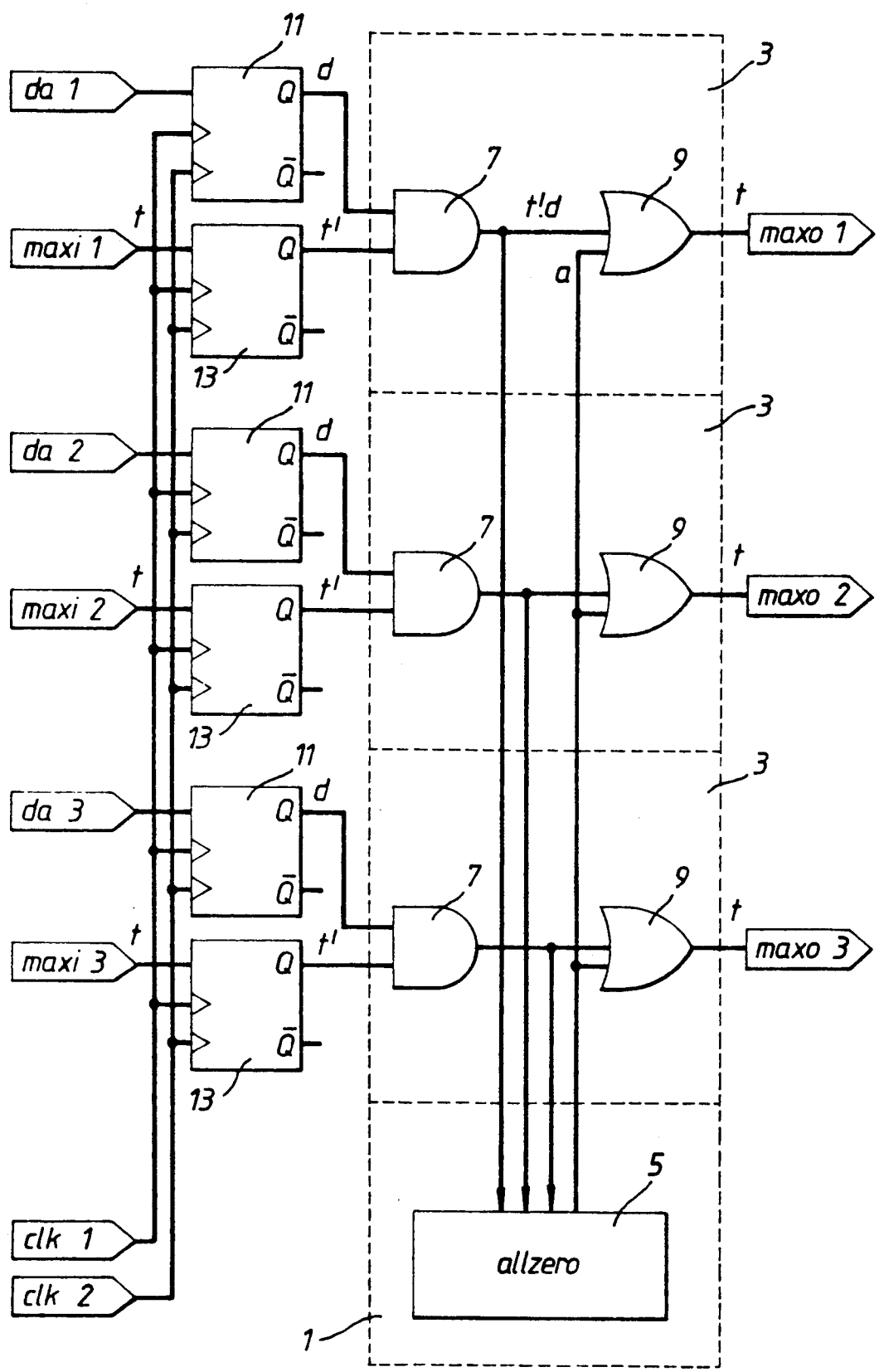
FIG. 1 is a block circuit diagram illustrating an Active HIGH implementation of this invention, in particular a single stage device in which iterations are performed cyclically.

So that this invention might be better understood, embodiments thereof will now be described and reference will be made to the drawings. The description that follows is given by way of example only.

In the following iteration, to determine the maximum of a set of binary encoded unsigned data words, a number of iterations is performed each upon a different set of test bits, each representing word bits of the same consecutive significance. The number of iterations performed corresponds to the number of bits N per word. In the first iteration a set of test bits that represent the most significant word bits of the set of data words is inspected and a tag, i.e. a tag signal set as ·TRUE·, is initiated for each word which as a word bit of logic value 1 in the leading most significant bit segment. A tag is also propagated if this is not the case but all the most significant word bits represented are all of logic value 0. Otherwise, no tag is propagated i.e. tag signals are ·FALSE·. In subsequent iterations a tag is propagated only for select words i.e. words for which a tag has been initiated and/or propagated during all preceding iterations. Also for the tag to be propagated for the successive iteration it is also necessary that the test bit represents a word bit of logic value 1 or if not of this value the value of all respective word bits represented are of the common logic value 0. A tag therefore will be propagated through all the iterations upto and including the final iteration for a word member of the data set that is the maximum of the set. The propagated tag or in the event of several words being the same and maximum, the propagated tags, is/are then used to select the maximum.

The algorithm performed above is represented by the Boolean expressions appearing below;

$$t_i = t_i' \cdot (d_i + a_0 \cdot d_i) = t_i' \cdot d_i + a_0; \; a_0 = \prod_{j=1}^{M} t_j' \cdot d_j.$$

Equations 1.

In the above expressions the result tag bit and the input tag bit of the i th word are represented by the symbols; $t_i$, $t_i'$. The respective word bit of the i th word is represented by the symbol $d_i$. The logic symbol $a_0$ represents the allzero logic function. In these expressions a bar is used to indicate the inverse and conventional symbols "+" and "·" are used to denote OR and AND logic operations. The product symbol pi denotes multiple AND operation.

For evaluation of the minimum a tag is initiated for each word of which the most significant word bit is of logic value 0, and no tag initiated for all remaining words of which the most significant bit is in each case logic value 1 except in the singular instance where each and every most significant word bit represented is of common logic value 1, in which case a tag is initiated for each and every word of the data set. In subsequent iterations each tag is only propagated for those words for which the test bit represents a word bit of logic value 0 or in the singular instance where all respective test bits represent word bits that are of logic value 1. The algorithm that is performed is represented by the Boolean expressions that follow below;

$$t_i = t_i' \cdot (d_i + a_1 \cdot d_i) = t_i' \cdot d_i + a_1; \; a_1 = \prod_{j=1}^{M} t_j' \cdot d_j.$$

Equations 2.

In these expressions the symbols $a_1$ represents the allone logic function.

A simple implementation is shown in FIG. 1. This shows a single stage digital electronic device for performing each of the iterations. The single stage logic circuit 1 comprises three sub-circuits 3, one for each data word constituting the set, and a common sub-circuit 5, an allzero logic component. Each of the bit sub-circuits 3 are identical and each comprises a 2-input AND-gate 7 and a 2-input OR-gate 9 one input of which is connected to the output of the AND-gate 7. The output of each AND-gate 7 is connected to a respective input of the allzero sub-circuit 5 and the output of the allzero sub-circuit 5 is connected in common to the other input of each of the OR-gates 9. Data from a primary source (not shown) is loaded in parallel, one word bit at a time, under the control of a bi-phase clock clk 1 and clk 2, into a bank of three flip flop registers 11.

In response to the bi-phase clock clk 1 and clk 2, a test bit representing a respective bit of the corresponding data word is made available at the non-inverting output Q of each respective flip flop register 11. These non-inverting outputs Q are connected to one of the inputs of each of the AND-gates 7. Tag signals maxo 1, maxo 2, and maxo 3, the logic operation results, are extracted at the single output of each OR-gate 9. In this single stage cyclic implementation each of these tag signals is applied to a respective input maxi 1, maxi 2, maxi 3 of a bank of further flip flop registers 13 where the same are stored for use in the next iteration. At the outset and for checking test bits corresponding to the most significant bits of the data words, each of the flip flop registers 13 is set to provide a logic 1 output. On subsequent clock pulses the tag signals, set or reset in the previous iteration, are made available at the non-inverting outputs Q of the flip flop registers 13. All the registers 11 and 13 are ganged to the common bi-phase clock clk 1 and clk 2 so that data word bits da 1, da 2 and da 3 and tag signals from the preceding iteration maxi 1, maxi 2, and maxi 3 can be loaded simultaneously and downloaded simultaneously. For words of half-byte size i.e. 4-bits per word, four iterations are performed, one on each clock pulse. The maximum of a data set may be identified and selected using the propagated tag or tags, one or more of the tag signals maxo 1, maxo 2, and maxo 3. These for example may be referred to a decoder and word memory.

To perform a minimum evaluation each AND-gate 7 may instead be connected to an inverting output $\overline{Q}$ of each of the data flip-flop registers 11.

Figure 2:
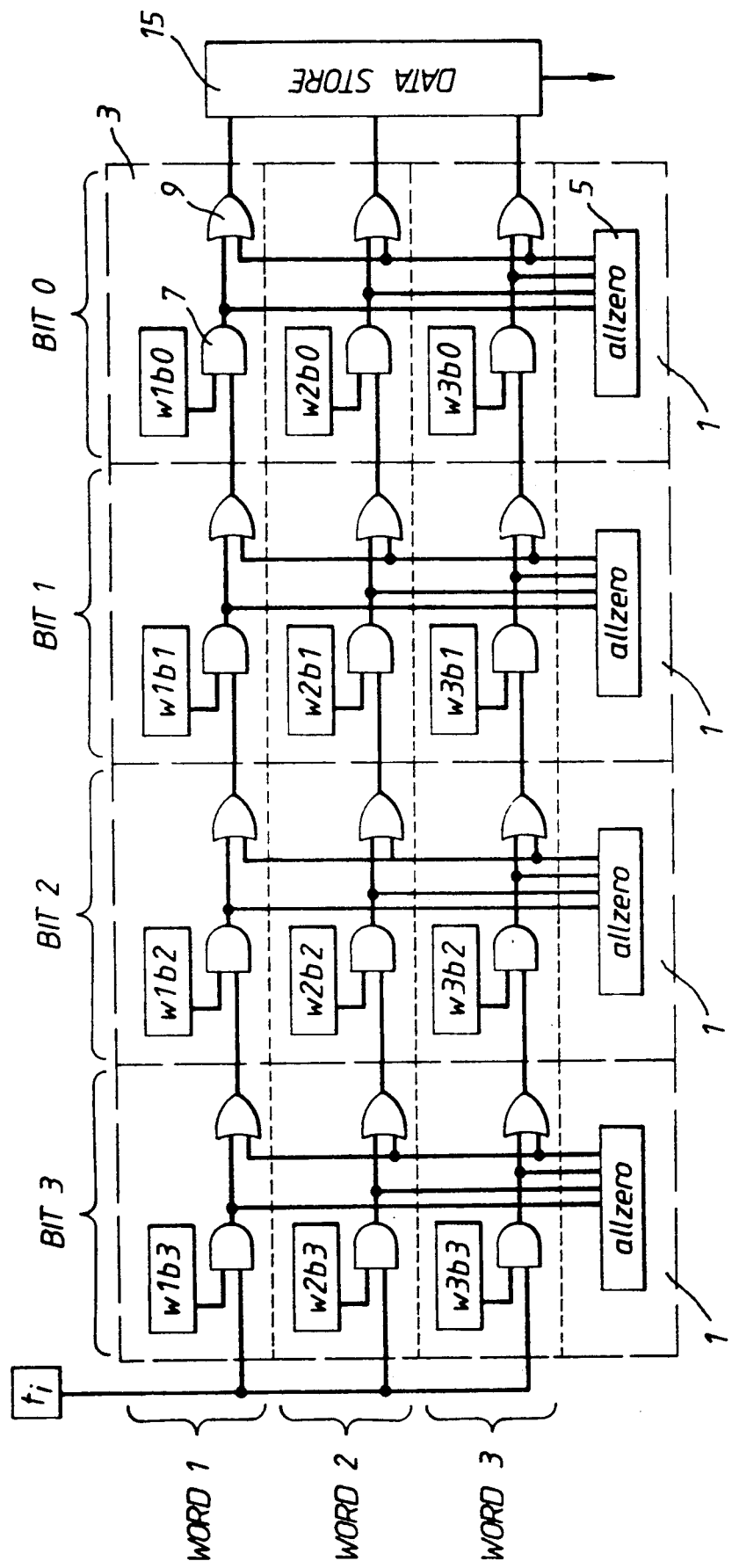
FIG. 2 is a block circuit diagram of an alternative Active HIGH implementation of this invention, a multistage device in which iterations are performed serially.

A preferred and a faster arrangement is shown in FIG. 2. In this arrangement four identical stages 1 are employed and instead of storing the tag signals after each iteration, tag signals are passed directly from stage to stage and the iterations performed in series as tag signals ripple through. Each stage 1 is arranged to receive sets of test bits representing word bits of the same but consecutive significance, from a primary or a secondary data source. Twelve, a 4×3 array of store elements w1b0 to w3b3 provide storage for the four bits bit 0, bit 1, bit 2, bit 3 of the three words word 1, word 2, word 3. The tag signals are passed from the final stage into a decoder and data store 15, which latter provides selection of the maximum of the data set from data words that are stored therein.

Both implementations described thus far implement the algorithm using Active HIGH i.e. ·TRUE·=1.

The arrangement and circuits for a digital electronic device suitable for evaluating both the maximum and the minimum of a data set constituted of five words each of one byte size i.e. 8-bits per word, are shown in FIGS. 3 to 9 of the drawings. In this implementation inverted logic, Active LOW i.e. ·TRUE·=0 is used.

To facilitate an understanding of the logic element arrangements that will be descried in the following text it will be noted that the Boolean expressions equations 1 and 2 may be inverted and re-expressed in a form more suitable for an understanding of the inverted logic employed:

Equations 3.
$$t_i' = (t_i' + d_i) + (t_i' + a_0 + d_i); a_0 = \sum_{j=1}^{M}(t_j' \cdot d_j).$$

Equations 4.
$$t_i' = (t_i' + d_i) + (t_i' + a_1 + d_i); a_1 = \sum_{j=1}^{M}(t_j' \cdot d_j).$$

Figure 3:
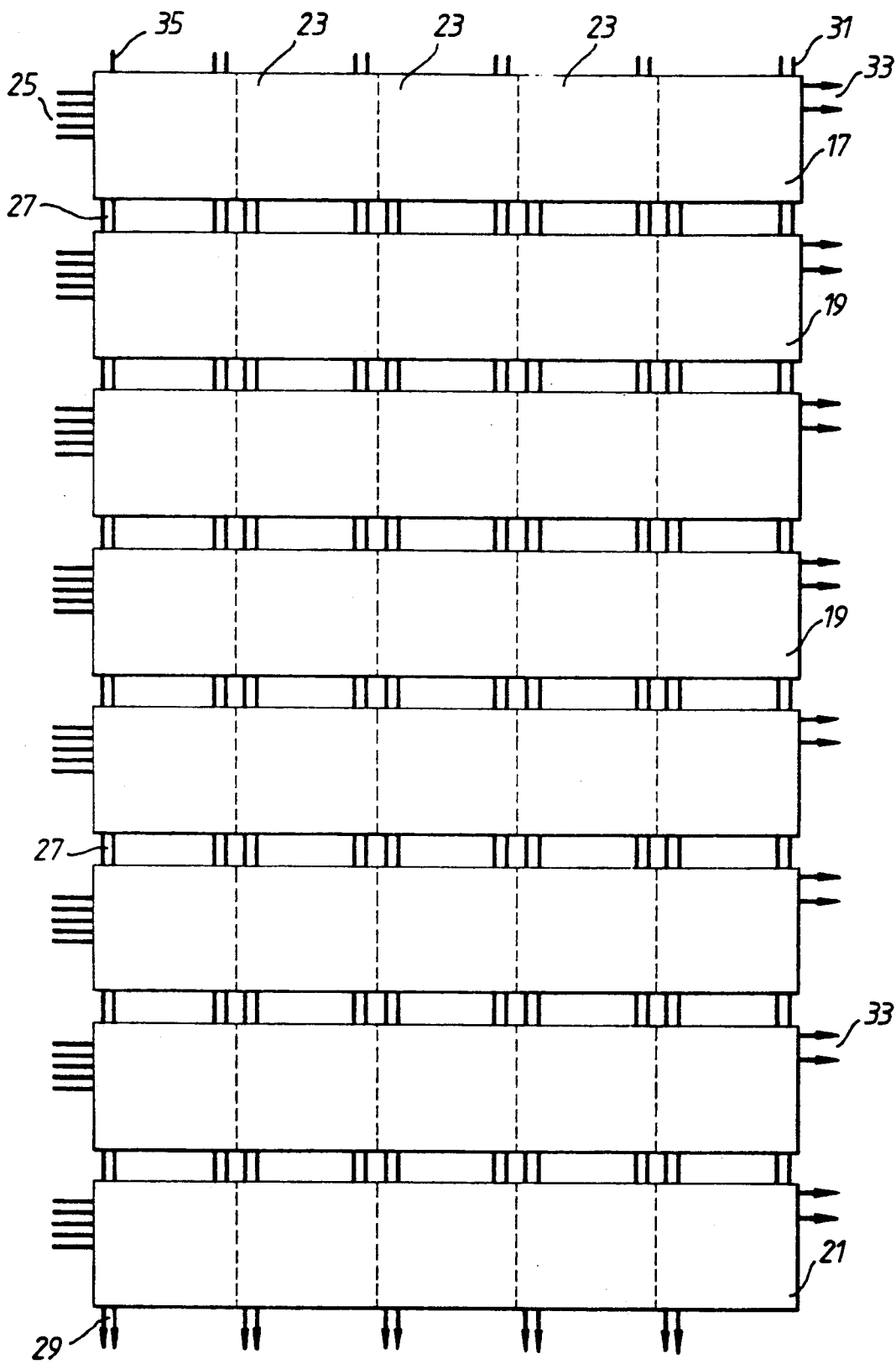
FIG. 3 is a block outline diagram of a multistage device for evaluating both maximum and the minimum of a set of five 8-bit words constituting a data set.

The general arrangement of the multistage digital electronic device is shown in FIG. 3. This device comprises eight stages, a most significant bit stage 17 and seven successive bit stages 19 the last one of which is a least significant bit stage 21. Each of the stages 17, 19, 21 is dedicated to processing test bits that represent word bits of the same respective consecutive significance. Each stage includes five sub-circuits, maximum and minimum bit cells 23, each to process a pair of complementary test bits representing a word bit of each word of the data set. Test bits are loaded into each stage via five paired inputs 25 and tag signals are passed onto the next consecutive stage 17 to 19, 19 to 19, 19 to 21 via paired interconnections 27, one of which carries a tag signal for maximum and the other of which carries a tag signal for minimum. Propagated tags are made available at five paired outputs 29 of the least significant bit stage 21. The result tag signals presented at the paired outputs 29 are applied to paired enable lines 31 that run through each of the stages 17, 19 and 21. As will be explained below these signals are used to release word bits onto an output bus for each of the maximum and minimum words. Paired word bit outputs 33 are shown for each stage 17, 19, 21. In place of tag signal inputs 27 the first logic stage, the most significant bit stage 17, has a single input 35 to which a common signal of logic value 0 is applied and passed to ganged paired inputs to each of the five bits cells 23 of this stage 17.

Figure 4:
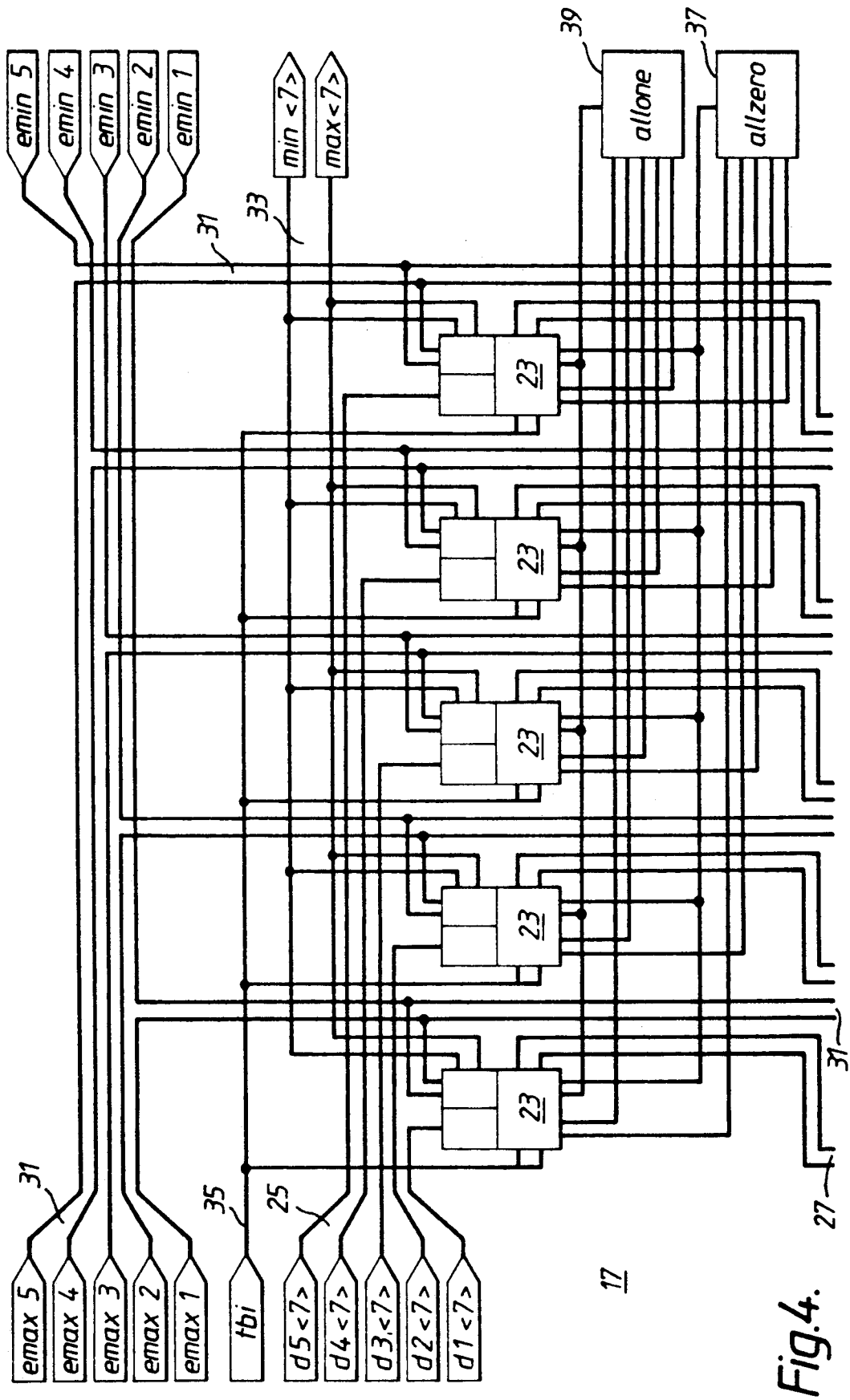
FIG. 4 is a block circuit diagram illustrating the first stage of the device shown in the preceding figure.

The internal arrangement of the most significant bit stage 17 is shown in FIG. 4. As shown in this figure, maximum tag enable signals emax 1 to emax 5 and minimum tag enable signals emin 1 to emin 5 are applied to the maximum and minimum bit cells 23. Most significant word bits max <7> and min <7> are down loaded from enabled bit cells 23 when appropriate enable signals are applied. The common signal input labeled tbi is also shown and is connected to each of the ganged paired inputs of the bit cells 23. A set of five test bit inputs d1 <7> to d5 <7> is also shown. By this means ordinary test bits that represent and are of the same logic value as the most significant bit of each of the five data words, are applied to each respective bit cell 23. For clarity of illustration the further set of five inputs for the complement test bits has been omitted. Each of the bit cells 23 has a pair of outputs each connected to a respective common sub-circuit, an allzero sub-circuit 37 and allone sub-circuit 39. The output of each of these sub-circuits 37 and 39 is connected in common to a respective input of each of the bit cells 23.

Figure 5:
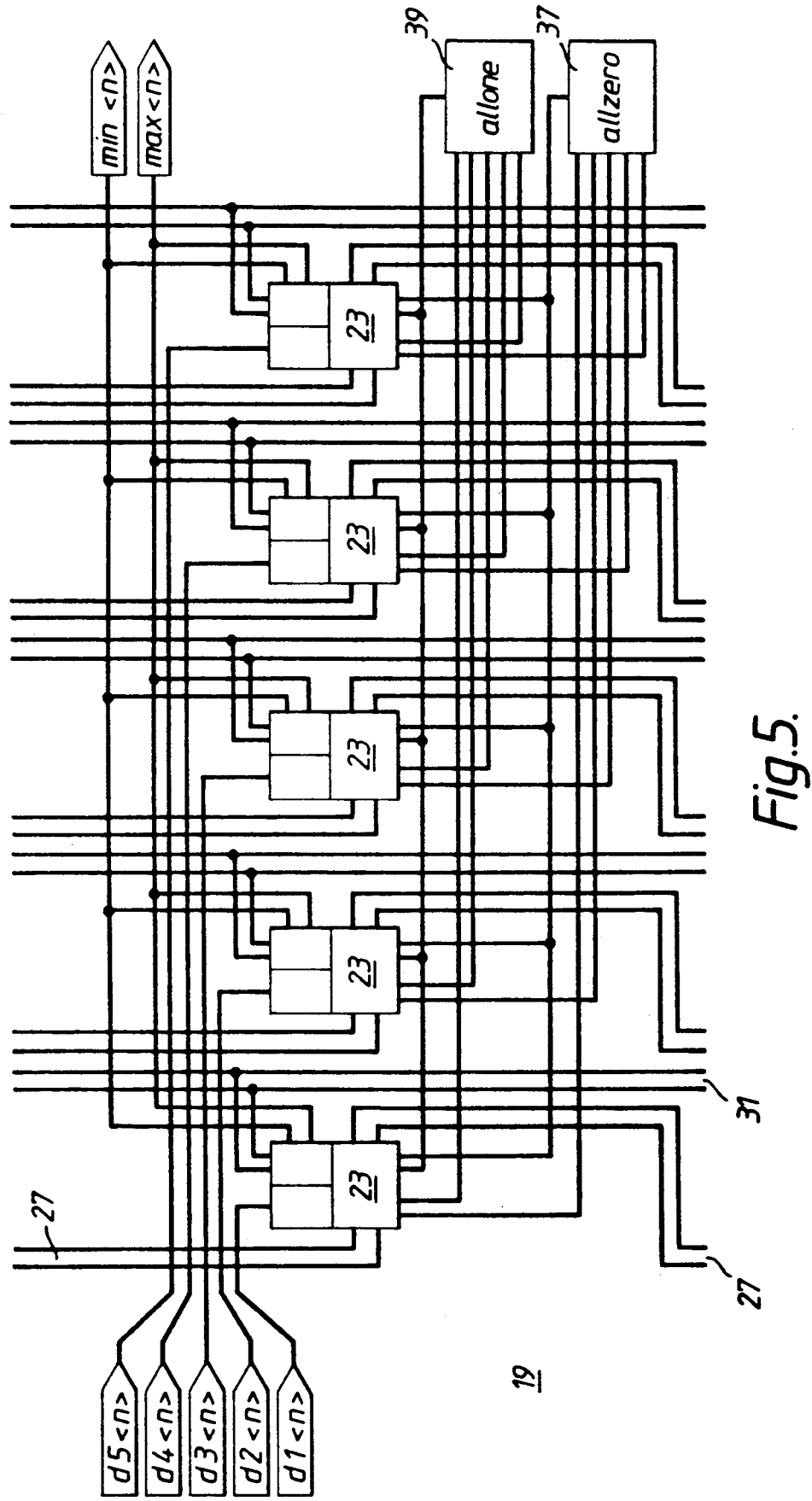
FIG. 5 is a block circuit diagram illustrating an intermediate stage of the device shown in the preceding FIG. 3.

The successive bit stage 19 shown in FIG. 5 is of essentially the same structure with the exception that each bit cell 23 has discrete paired inputs 27 for receiving maximum and minimum tag signals passed from the previous stage, the most significant bit stage 21 or another successive bit stage 19. Five inputs d1 <n> to d5 <n> are shown for those ordinary test bits that represent the set of word bits of n th significance. Upon enable, word bits max <n> and min <n> are down loaded for the maximum and the minimum.

Figure 6:
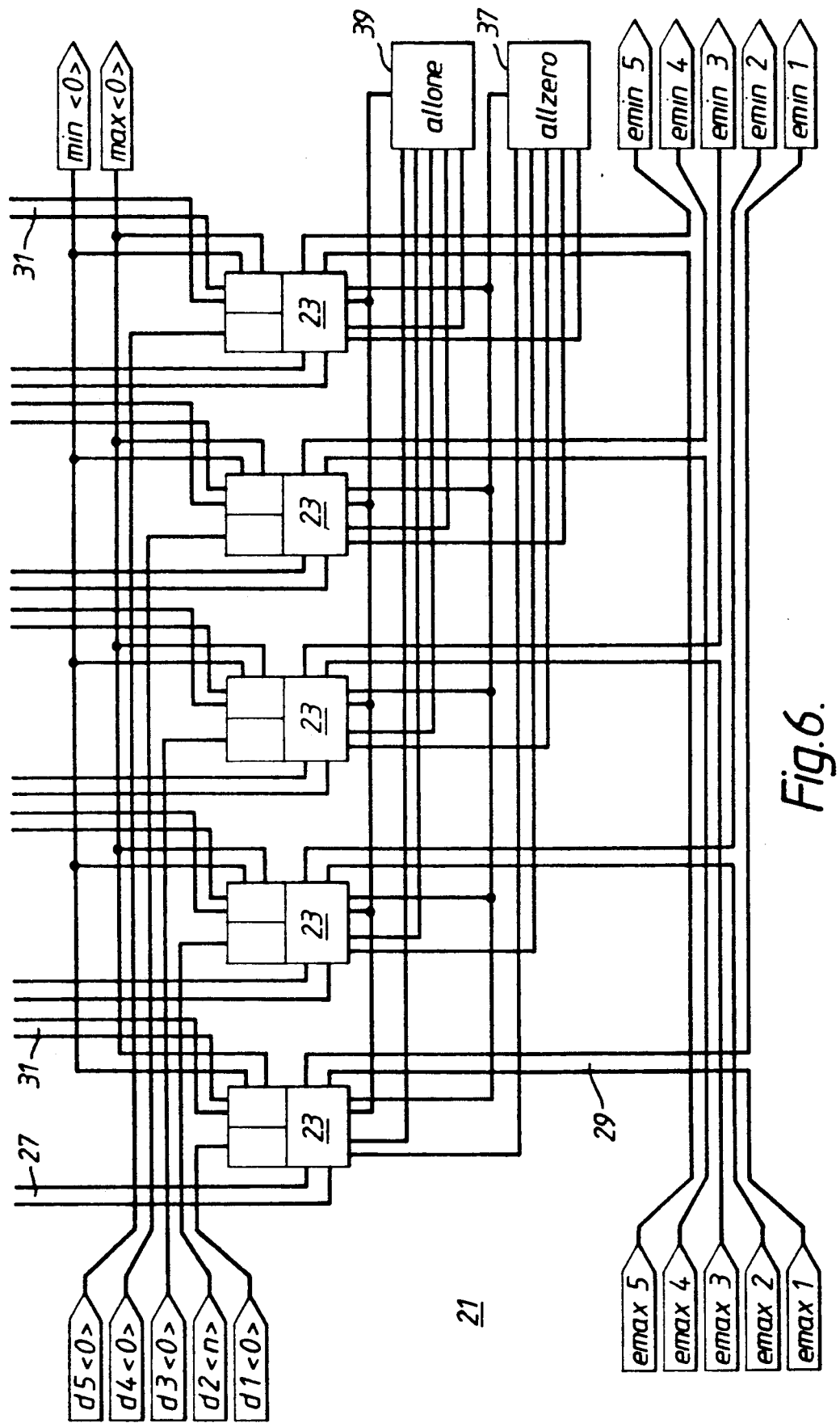
FIG. 6 is a block circuit diagram illustrating the last stage of the device shown in the preceding FIG. 3.

The least significant bit stage 21 is shown in FIG. 6 and this also is essentially the same as the arrangement shown in the preceding FIG. 5. The result tag signal outputs emax 1 to emax 5 and emin 1 to emin 5 are shown.

Figure 7:
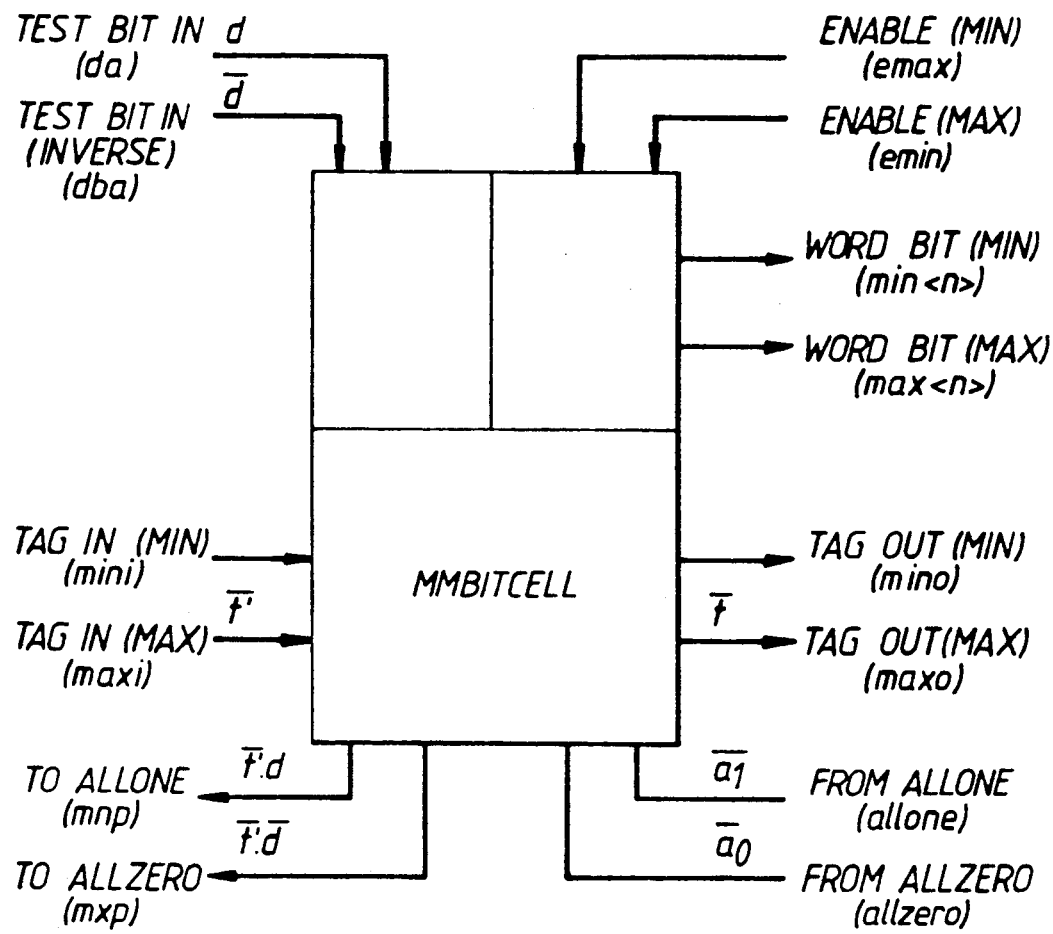
FIG. 7 is an outline diagram of a logic cell one of many replicated in the digital electronic device as shown in FIGS. 3 to 6 preceding, which outline diagram illustrates the inputs and outputs of this cell.

One of the bit cells 23 is shown in outline in FIG. 7. This cell 23 has four pairs of inputs, eight in all and three pairs of outputs, six in all. It has thus a pair of inputs for receiving the ordinary and complement test bits, a pair of inputs for receiving the maximum and minimum tag signals from the preceding bit stage, a pair of inputs for receiving signals from the common sub-circuits allone and allzero, and a pair of inputs for receiving the maximum and minimum result tag signals, the enable signals, from the least significant bit stage 21. Each bit cell has a pair of outputs for passing processed test bit signals to the allone and allzero common sub-circuits 39 and 37, a pair of outputs for the maximum and minimum tag signals, and a pair of outputs for down loading bits for the maximum and the minimum.

The circuit arrangement of each bit cell 23 is shown in FIG. 8. Each cell includes a maximum sub-circuit 41, a minimum sub-circuit 43 a maximum selection sub-circuit 45 and a minimum selection sub-circuit 47. The maximum and minimum sub-circuits 41 and 43 are essentially of the same arrangement each having a three input NOR-gate 49, a first two input NOR-gate 51, and a second two input NOR-gate 53 the two inputs of which are connected to the respective outputs of the three input NOR-gate 49 and the first two input NOR-gate 51. In the maximum sub-circuit 41 the output allzero of the allzero common sub-circuit 37, the maximum tag signal maxi from the corresponding bit cell 23 in the preceding bit stage 19 or 21, and the ordinary test bit da are applied to the three inputs of the three input NOR-gate 49. The maximum tag signal maxi and the complement test bit dba are applied to the two inputs of the two input NOR-gate 51. A processed test bit signal mxp is taken from the output of the first two input NOR-gate 51 and is referred to the allzero common sub-circuit 37. The maximum tag signal output maxo is taken from the output of the second NOR-gate 53. In the minimum sub-circuit 43 the output signal allone from the allone common sub-circuit 39, the minimum tag signal mini from the corresponding bit cell 23 of the preceding bit stage 19 or 21, and the complement test bit dba are applied to the three inputs of the three input NOR-gate 49. The minimum tag signal mini and the ordinary test bit da are applied to the two inputs of the first two input NOR-gate 51. A processed test bit signal map is taken from the output of the first two input NOR-gate 51 and applied to the allone common sub-circuit 39. A minimum tag signal mino is taken from the output of the second two input NOR-gate 53. The selection sub-circuits 45 and 47 are essentially of the same arrangement. Maximum and minimum word bits max <n> and min <n> are down loaded from these sub-circuits via control gates, tri-state buffer switches 55.

The input channel to each of these switches 55 is connected to the complement test bit input dba via an inverter 57. Each tri-state buffer switch 55 is controlled by enable signals emax emin which are applied to the control inputs of each switch 55 via series inverters 59 and 61 and a parallel inverter 63.

Figure 9:
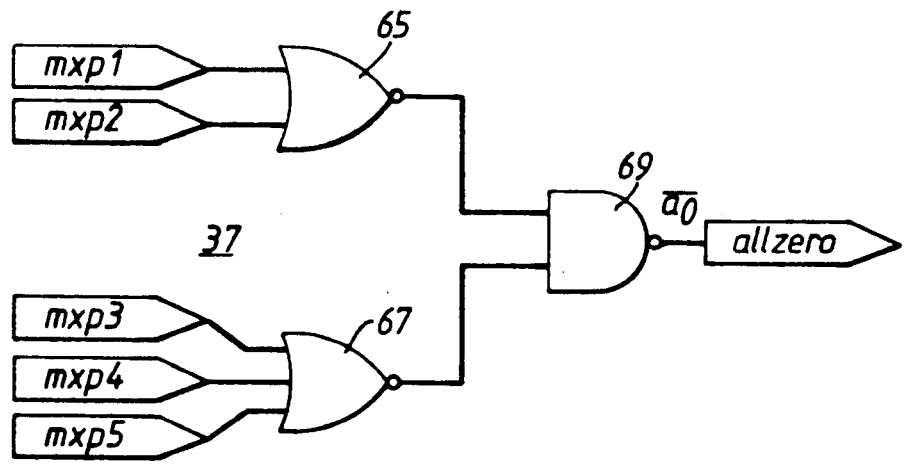
FIG. 9 is a circuit diagram of an additional sub-circuit which is replicated for each stage of the digital electronic device shown in FIGS. 3 to 6 preceding.

An allzero common sub-circuit 37 is shown in FIG. 9. This sub-circuit 37 includes a two input NOR-gate 65, a three input NOR-gate 67 and a two input NAND-gate 69 the two inputs of which are connected to the respective outputs of the two NOR-gates 65 and 67. The allzero output signal allzero is taken from the output of the NAND-gate 69. The five processed test bit signals mxp1 to mxp 5 from the five maximum sub-circuits 41 of a respective one of the bit stages 17, 19 or 21 are applied to the inputs of the two NOR-gates 65 and 67.

The allone common sub-circuit 39 has essentially the same arrangement. It provides an allzero signal output allzero and receives five processed test bit signals mnp 1 to mnp 5 from the minimum sub-circuits 43 of the five bit cells 23 of a respective one of the bit stages 17, 19, or 21.

Figure 10:
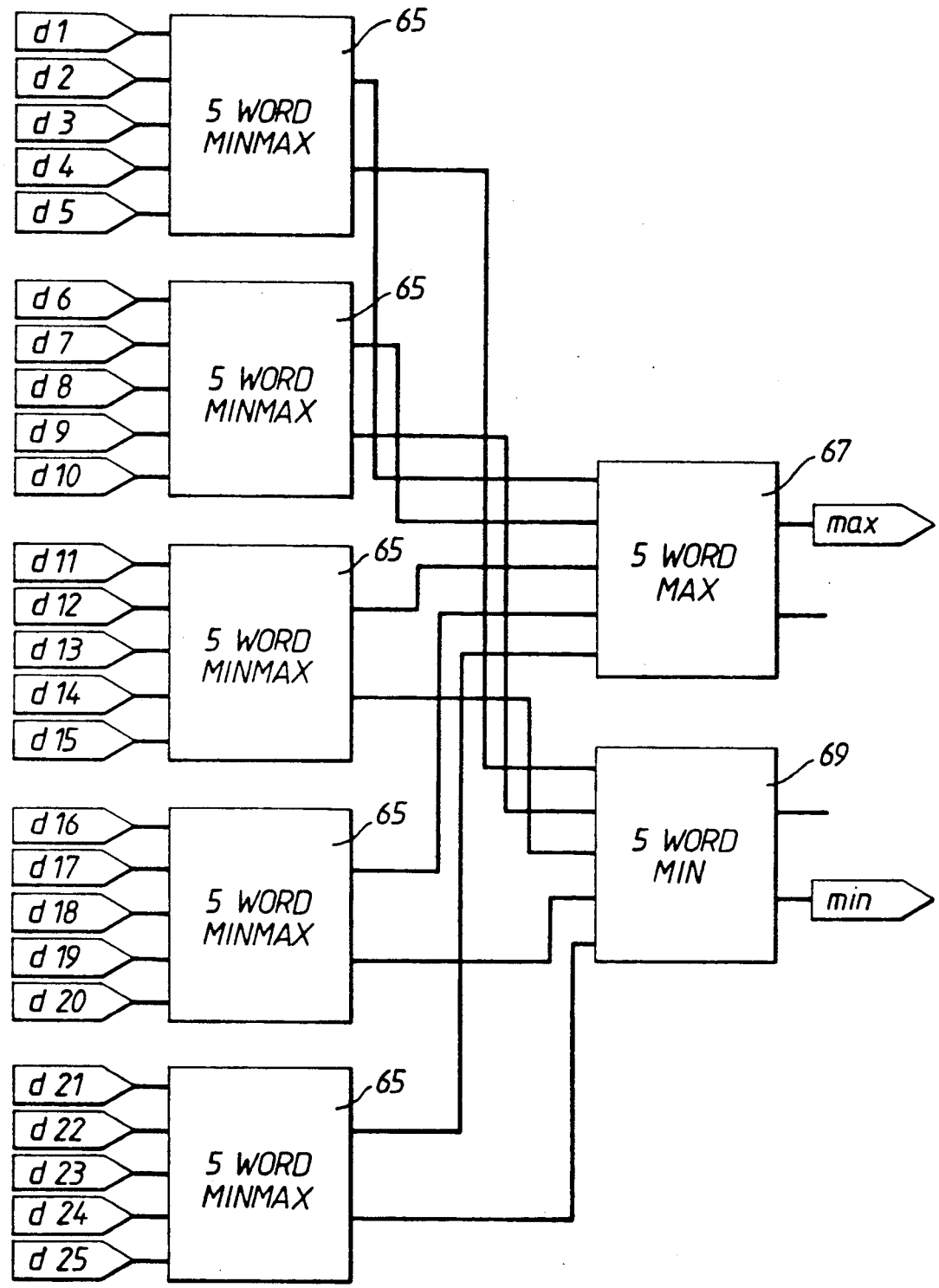
FIG. 10 is a block diagram showing parallel and serial combination of electronic devices, which combination allows the evaluation of extrema for a data set of large size.

An arrangement is shown in FIG. 10 for evaluating the maximum and minimum of a set of twenty-five words. These twenty-five words for example may be words encoded for a five by five array of pixels, part of a video frame. This arrangement includes five parallel 5-word minimum and maximum digital electronic devices 65. Each of these devices 65 may have the form of the 5-word minimum and maximum digital electronic device described in preceding FIGS. 3 to 9. Each of these devices 65 operates upon sub-sets of test bits e.g. d1 to d5, d6 to d10, d11 to d15, d16 to d20 and d21 to d25, each representing a sub-set of the twenty-five words words 1 to 5, 6 to 10, 11 to 15, 16 to 20, and 21 to 25. Each of the devices 65, after a single clock pulse, down-loads a maximum and a minimum data word for each sub-set, i.e. a sub-maximum and a sub-minimum. The five sub-maxima are applied to a 5-word maximum digital electronic device 67, which device 67 is a simplified version of the maximum and minimum device 65 i.e. a device including only maximum sub-circuits 41, maximum selection sub-circuits 45 and allzero common sub-circuits 37. The maximum is down-loaded from this maximum digital electronic device 67 following a second clock pulse. Similarly the five sub-minima are applied to a 5-word minimum digital electronic device 69. This also may be a simplified version of the 5-word minimum and maximum digital electronic device 65 in which only the minimum sub-circuits 43, the minimum selection sub-circuits 47, and the allone common sub-circuits 39 are included. The minimum is down-loaded from this minimum digital electronic device 69 on the same second clock pulse.

Other variants of the above digital electronic devices and their combination are not precluded from the general scope of this invention, which is now set forth in the claims that follow.

Equations 1.
$$t_i = t_i' \cdot (d_i + a_0 \cdot d_i) = t_i' \cdot d_i + a_0; a_0 = \prod_{j=1}^{M} t_j' \cdot d_j$$

Equations 2.
$$t_i = t_i' \cdot (d_i + a_1 \cdot d_i) = t_i' \cdot d_i + a_1; a_1 = \prod_{j=1}^{M} t_j' \cdot d_j$$

-continued $$t_i' = (t_i' + d_i) \cdot (t_i' + a_0 + d_i). \; a_0 = \sum_{j=1}^{M} (t_j' \cdot d_j).$$

Equations 3.

$$t_i' = (t_i' + d_i) \cdot (t_i' + a_1 + d_i); \; a_1 = \sum_{j=1}^{M} (t_j' \cdot d_j).$$

Equations 4.

I claim:

1. A digital electronic device for evaluating an extremum of a set of N-bit binary coded data words each bit of which has a respective one of a first logic value and a second logic value, which device comprises: source means to provide a multiplicity of test bits, at least one of two representative test bits for each word bit of each data word; a plurality N of logic stages, namely a most significant bit logic stage and a plurality N−1 of lower significance bit logic stages including a least significant bit logic stage, each logic stage having at least one of two bit inputs for each word, all of which are connected to the source means to receive collectively a set of the test bits, which set for each respective logic stage is representative of word bits of the same respective significance, each logic stage also having a plurality of tag signal outputs, one for each data word, and each lower significance bit logic stage also having a plurality of tag signal inputs, one for each data word, each one connected to a respective one of the plurality of tag signal outputs of the logic stage immediately preceding; and data word selection means, having a plurality of tag signal inputs, one for each data word, each one connected to a respective one of the plurality of tag signal outputs of the least significant bit logic stage, to select an extremum data word indicated by a tag signal propagated as set TRUE; wherein the most significant bit logic stage comprises means including a first logic circuit connected between the bit inputs and the tag signal output thereof to provide a respective tag signal set as TRUE for each data word having a most significant bit of the first logic value, or every respective tag signal set as TRUE if every most significant bit is of the second logic value, else respective tag signals are FALSE; and each lower significance bit logic stage includes a second logic circuit connected between the bit inputs, tag signal input and tag signal outputs, which second logic circuit functions to provide for each data word corresponding to a tag signal set as TRUE at the tag signal output of the logic stage immediately preceding, a respective tag signal set as TRUE if either the respective word bit is of the first logic value, or every respective word bit of the set of data words is of the second logic value, else respective tag signals are reset as FALSE.

2. A digital electronic device for evaluating an extremum of a set of N-bit binary coded data words each bit of which has a respective one of a first logic value and a second logic value, which device comprises: source means to provide a multiplicity of test bits, at least one of two representative test bits for each word bit of each data word; a plurality N of logic stages, namely a most significant bit logic stage and N−1 lower significance bit logic stages including a least significant bit logic stage, each logic stage comprising a plurality of bit sub-circuits, one for each data word, and a common sub-circuit, each of said bit sub-circuits comprising an AND-gate having first and second inputs and an output and an OR-gate having first and second inputs and an output, and said common sub-circuit comprising a multiple input NOR-gate, there being provided means connecting the first input of said AND-gate to receive a respective test bit from said source, means connecting the output of said AND-gate to the first input of the respective OR-gate and to a respective input of the NOR-gate of the respective common sub-circuit, means connecting an output of the NOR-gate of the respective common sub-circuit to the second input of said respective OR-gate, and means connecting the output of said respective OR-gate to a tag signal output of said bit sub-circuit, whereby the first inputs of the bit sub-circuit AND-gates of a logic stage collectively receive a set of test bits representative of word bits of the same respective significance from the set of data words to be evaluated, and the NOR-gate of a common sub-circuit receives outputs from all AND-gates of the respective logic stage and has its output connected to the respective second inputs of all the bit sub-circuit OR-gates of said respective logic stage, and each lower significance bit logic stage has a respective one of the set of tag signal outputs of the immediately preceding logic stage, one for each data word, connected to the second input of the AND-gate in the respective bit sub-circuit; and data word selection means having a plurality of tag signal inputs, one for each data word, each one connected to a respective one of the set of tag signal outputs of the least significant bit logic stage to select an extremum data word indicated by a tag signal propagated as set TRUE; wherein the most significant bit logic stage is arranged to provide a respective tag signal set as TRUE for each data word having a most significant bit of the first logic value, or every respective tag signal set as TRUE if every most significant bit is of the second logic value, else respective tag signals are FALSE; and each lower significance bit logic circuit is arranged to provide for each data word corresponding to a tag signal set as TRUE at the respective tag signal output of the immediately preceding logic stage a respective tag signal set as TRUE if either the respective word bit is of the first logic value, or every respective word bit of the set of data words is of the second logic value, else respective tag signals are reset as FALSE.

3. A digital electronic device for evaluating an extremum of a set of N-bit binary coded data words each bit of which has a respective one of a first logic value and a second logic value, which device comprises: source means to provide a multiplicity of test bits each being one of two representative test bits for each word bit of each data word, namely an ordinary test bit and a complementary test bit; a plurality N of logic stages, namely a most significant bit logic stage and N−1 lower significance bit logic stages including a least significant bit logic stage, each logic stage comprising a first plurality of bit sub-circuits, one for each data word, and a first common sub-circuit, each of said bit sub-circuits comprising a first NOR-gate having first, second and third inputs and an output, a second NOR-gate having first and second inputs and an output, and a third NOR-gate having first and second inputs and an output, there being provided means connecting the first input of the first NOR-gate to receive a respective ordinary test bit from said source, means connecting the second input of said first NOR-gate and the first input of the second NOR-gate to a respective first tag signal input, means connecting the second input of said second NOR-gate to receive the respective complementary test bit from said source, means connecting the outputs of said first and second NOR-gates to the first and second inputs respectively of said third NOR-gate, and means connecting the output of said third NOR-gate to a respective first tag signal output, and the first common sub-circuit comprising multiple input OR-gate means and having means connecting respective inputs thereof to receive outputs from the second NOR-gates of all first bit sub-circuits of the respective logic stage and means connecting the output of said multiple input OR-gate means to the third input of each and every first NOR-gate of the respective logic stage, whereby the first inputs of the first NOR-gates of the first plurality of bit sub-circuits of a logic stage collectively receive a set of ordinary test bits representative of word bits of the same respective significance from the set of data words to be evaluated and the second inputs of the second NOR-gates collectively receive a set of complementary test bits representative of word bits of the same respective significance from said set of data words, and each lower significance bit logic stage has respective ones of the set of first tag signal outputs of the immediately preceding logic stage, one for each data word, connected to the respective first tag signal inputs; and data word selection means having a plurality of tag signal inputs, one for each data word, each one connected to a respective one of the set of tag signal outputs of the least significant bit logic stage to select an extremum data word indicated by a tag signal propagated to set TRUE; wherein the most significant bit logic stage is arranged to provide a respective tag signal set as TRUE for each data word having a most significant bit of the first logic value, or every respective tag signal set as TRUE if every most significant bit is of the second logic value, else respective tag signals are FALSE; and each lower significance bit logic circuit is arranged to provide for each data word corresponding to a tag signal set as TRUE at the respective tag signal output of the immediately preceding logic stage a respective tag signal set as TRUE if either the respective word bit is of the first logic value, or every respective word bit of the set of data words is of the second logic value, else respective tag signals are reset as FALSE.

4. A device as claimed in claim 3 wherein each logic stage further comprises a second plurality of bit sub-circuits, one for each data word, and a second common sub-circuit, each of said bit sub-circuits comprising a fourth NOR-gate having first, second and third inputs and an output, a fifth NOR-gate having first and second inputs and an output, and a sixth NOR-gate having first and second inputs and an output, there being provided means connecting the first input of the fourth NOR-gate to receive a respective complementary test bit from said source, means connecting the second input of said fourth NOR-gate and the first input of the fifth NOR-gate to a respective second tag signal input, means connecting the second input of the fifth NOR-gate to receive the respective ordinary test bit from said source, means connecting the outputs of said fourth and fifth NOR-gates to the first and second inputs respectively of the sixth NOR-gate, and means connecting the output of the sixth NOR-gate to a respective second tag signal output, and the second common sub-circuit comprising multiple input OR-gate means and having means connecting respective inputs thereof to receive outputs from the fifth NOR-gates of all second bit sub-circuits of the respective logic stage and means connecting the output of said multiple input OR-gate means to the third input of each and every fourth NOR-gate of the respective logic stage.

5. The device as claimed in claim 1 wherein each bit sub-circuit includes a control gate having a signal input connected to receive a respective one of the test bits and at least one control input connected to a respective tag signal output of the least significant bit logic stage, a plurality of the control gates providing said data word selection means.

6. An arrangement comprising a plurality of devices as claimed in claim 4 combined in parallel with one another and in series with a further essentially identical device.

* * * * *